United States Patent [19]

Cabrera

[11] 4,290,795
[45] Sep. 22, 1981

[54] NECK RING ASSEMBLY FOR AUTOMATIC BLOW MOLDING MACHINES

[75] Inventor: Armando N. Cabrera, Monterrey, Mexico

[73] Assignee: Investigacion Fic Fideicomiso, Monterrey, Mexico

[21] Appl. No.: 149,424

[22] Filed: May 13, 1980

[51] Int. Cl.³ .............................................. C03B 9/325
[52] U.S. Cl. ..................................... 65/260; 65/232; 65/235; 65/323
[58] Field of Search ................... 65/232, 235, 260, 323

[56] References Cited

U.S. PATENT DOCUMENTS 3,981,673  9/1976  Sokolow ........................ 65/260 X
4,052,187  10/1977  Spaeth et al. ..................... 65/235 X

*Primary Examiner*—Arthur D. Kellogg
*Attorney, Agent, or Firm*—Kemon & Estabrook

[57] ABSTRACT

A rotatable neck ring assembly for use primarily in an automatic blow molding machine includes an annular bushing and a concentrically arranged series of pivotally mounted foot members which in their closed position, cooperate with the bushing to grip the rim of a parison and hold it securely during the molding process. These pivoted foot members, which are spring biased to a closed position, are kept into firm engagement with the bushing by the upwardly moving parison mold. A first cam surface on the outer surface of the foot members cooperates with a corresponding surface on a concentrically surrounding sleeve to hold the foot members tightly against the bushing to grip the rim of the parison and hold it securely during the molding process. The cooperating cam surfaces on the foot members and the surrounding sleeve create a hoop tension in the bushing which must be overcome to pivot the foot members to open position at completion of the molding process. A second set of cooperating cam surfaces on the upper portion of the sleeve and foot members is effective during the application of hydraulic pressure to the uppermost surface of the foot members to greatly aid in overcoming the hoop tension in the bushing and move the foot members to open position.

1 Claim, 3 Drawing Figures

NECK RING ASSEMBLY FOR AUTOMATIC BLOW MOLDING MACHINES

BACKGROUND OF THE INVENTION

As is well known to those skilled in this art, neck rings are rotatable assemblies which cooperate with the parison mold to support the upper end of the parison as soon as it is formed and on through the remainder of the molding cycle. Neck rings of the prior art conventionally include a plurality of segments which are held in closed position by a garter type spring which is the only means for holding the neck ring in a closed parison supporting position. Due to the limited holding force of such garter spring arrangements, every time that the parison is formed in the parison mold while in contact with the neck ring assembly, small amounts of molten glass are permitted to enter between the mating surfaces of the neck ring segments resulting in a high rate of wear on the movable and mating components of the assembly. As pointed out in co-pending application, Ser. No. 107,850, owned by the same assignee as the present case, a neck ring assembly is disclosed which alleviates many of the problems of the prior art by providing for a greatly increased pressure between the mating neck ring segments in the closed position. The present invention is a further improvement in that it provides an improved structure for moving the neck ring segments from closed to open position and which requires the application of less force to accomplish the opening.

BRIEF SUMMARY OF THE INVENTION

In accordance with the present invention, the neck ring structure of the above mentioned application is modified by providing a second set of cam surfaces on the sleeve and the pivoted foot members at the upper ends of each which are effective during hydraulic application of force to the pivoted segments to cam them toward open position.

DETAILED DESCRIPTION

Each neck ring is formed of a bushing 10 and a plurality of pivoted segmental foot members 12. Each neck ring assembly further includes an annular sleeve 16 having an external ring gear 18 formed in its periphery to provide a drive connection for rotating the ring during the molding operation.

Figures 1A, 1B:
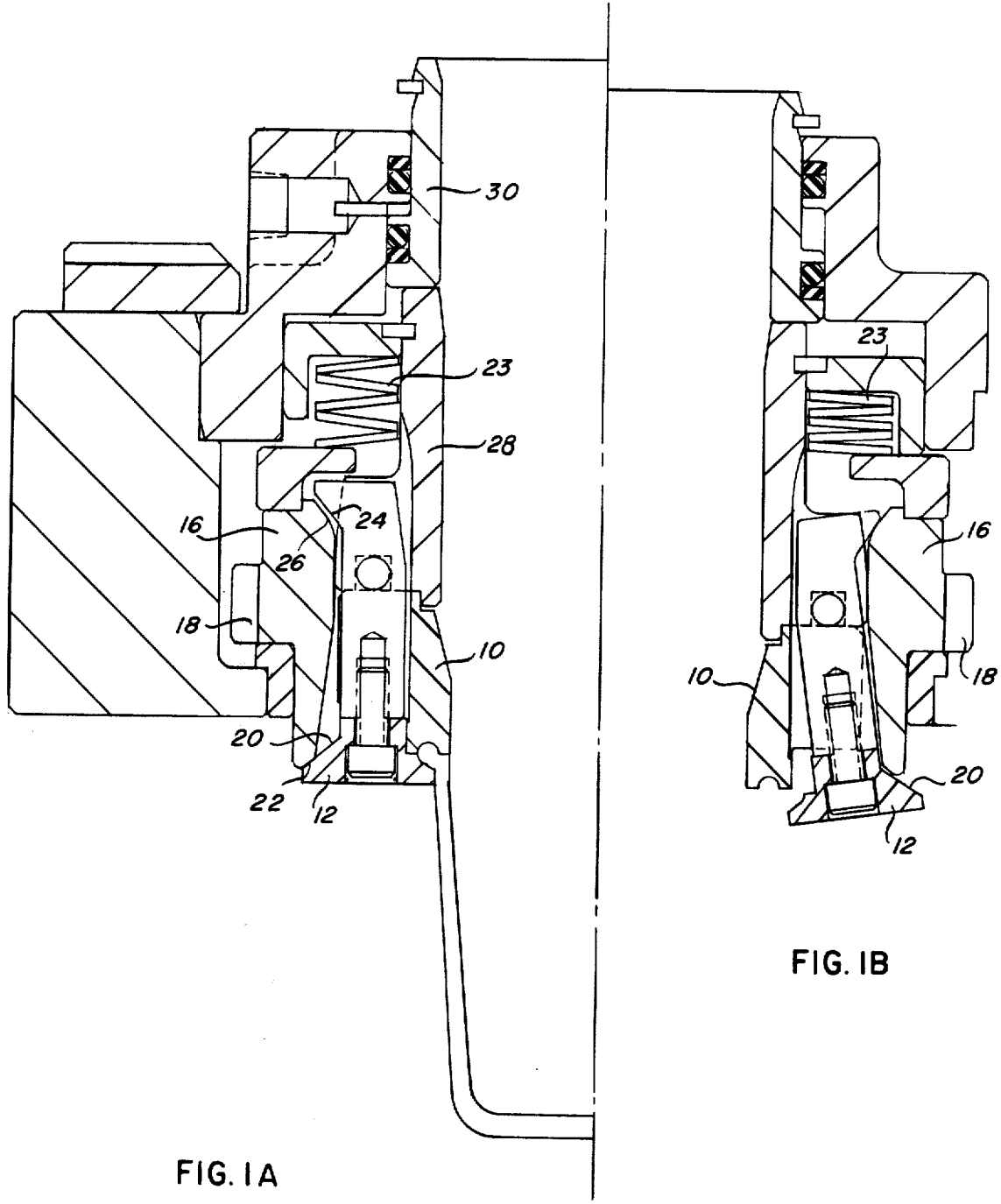
FIGS. 1A and 1B are sectional views of the neck ring assembly in the closed and open positions respectively.
Figure 2:
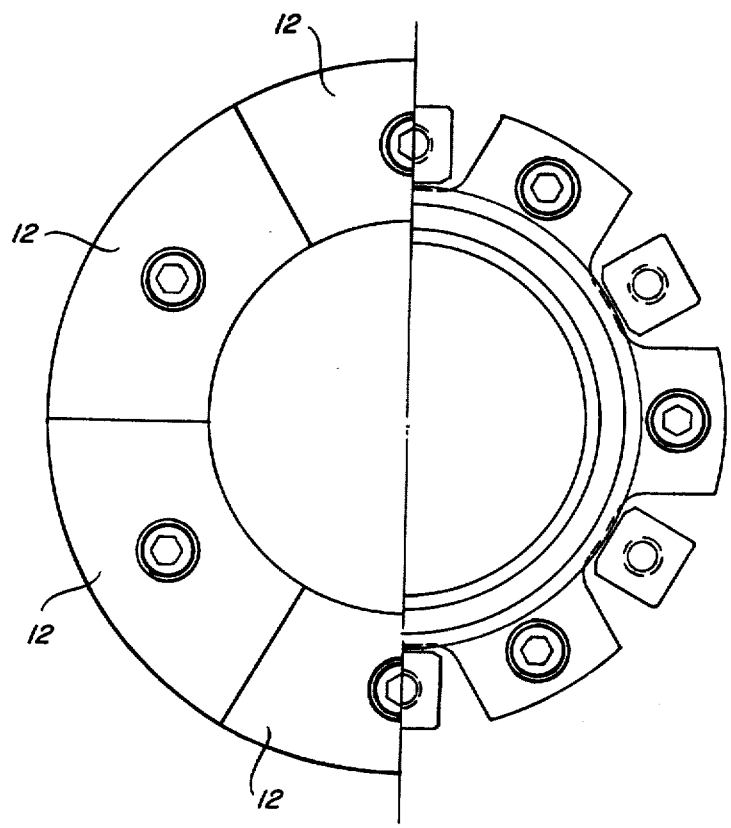
FIG. 2 is a bottom plan view of the assembly shown in FIG. 1, the lefthand portion corresponding to the closed position of parts in FIG. 1A and the righthand portion corresponding to the open position of the parts shown in FIG. 1B but with the pivoted foot members removed.

Each pivoted foot member 12 includes a first cam surface 20 which cooperates with a cam surface 22 at the lower inner end of the sleeve 16. Expansion of the spring 23 raises the sleeve 28 and pulls the foot members 12 and moves them upwardly from the open position shown in FIG. 1B to the closed position shown in FIG. 1A. As each foot member is moved upwardly, the cam surfaces 20 and 22 are in contact and are effective to create a substantial hoop tension in the bushing 10 which holds the foot members in the closed position of FIG. 1A and the parison mold also engages the foot members 12 to secure them in the closed position with a very substantial force and one which is far in excess of any created by the garter springs of the prior art. There is also a substantial frictional force created which must be overcome to return the foot members to the position of FIG. 1B as well as overcoming the force of the Belleville spring 23 to release the finished ware from the assembly.

In accordance with the present invention, a second set of cooperating cam surfaces 24, 26, are formed adjacent the upper end of the foot members 12 and the sleeve 16 respectively. These surfaces perform no function during the closing of the assembly, but they are operative during the opening of the assembly in a manner to be described hereinafter.

Substantially as disclosed in the aforementioned co-pending application, Ser. No. 107,850, the foot members are pivotally carried in the counterbore of a cylindrical sleeve 28 which also carries the bushing 10. A further cylindrical sleeve 30 forms the piston of a hydraulic motor which when activated applies a downward force to the ring 28, the bushing 10 and each of the pivoted foot members 12. This engagement between the cam surfaces 24, 26 is effective to cam the foot members from the closed position shown in FIG. 1A to the open position shown in FIG. 1B. As compared to the same operation in the co-pending application, Ser. No. 107,850, less force is required to accomplish the opening function to release the finished ware.

While a preferred embodiment of the present invention has been herein shown and described, applicant claims the benefit of a full range of equivalents within the scope of the appended claims.

I claim:

1. A rotatable ware supporting neck ring assembly for a blow molding machine comprising in combination:

a horizontal support member;

an annular bushing mounted for rotation on a vertical axis on said support member;

a plurality of segments individually pivotally supported on horizontal axis and surrounding said bushing, each having a foot portion, which in the closed ware supporting position of the assembly are in intimate contact with each other and with the lower axial and radial faces of said bushing;

means defining a radially inwardly opening annular groove in the adjoining inner surfaces of said bushing and said segments in the closed position thereof said groove forming the mold for the rim of the parison;

an annular sleeve rotatably carried in said support member and concentrically surrounding said bushing and segments;

first and second cam surfaces at vertically opposite ends of each segment respectively;

third and fourth cam surfaces at opposite ends of said sleeve for engaging said first and second cam surfaces of said segments during the opening and closing movements of the assembly respectively;

means mounting said bushing and segments for sliding vertical movement on said support member between upper and lower positions so that in the upper position said foot portions of said segments are cammed radially inwardly into tight engagement with each other and with the lower portion of said bushing and in the lower position said segments are cammed out of engagement with each other and the lower portion of said bushing; and hydraulic means for moving said bushing and segments downwardly to cam said segments to open, warereleasing position.

* * * * *